United States Patent Office 3,121,549
Patented Feb. 18, 1964

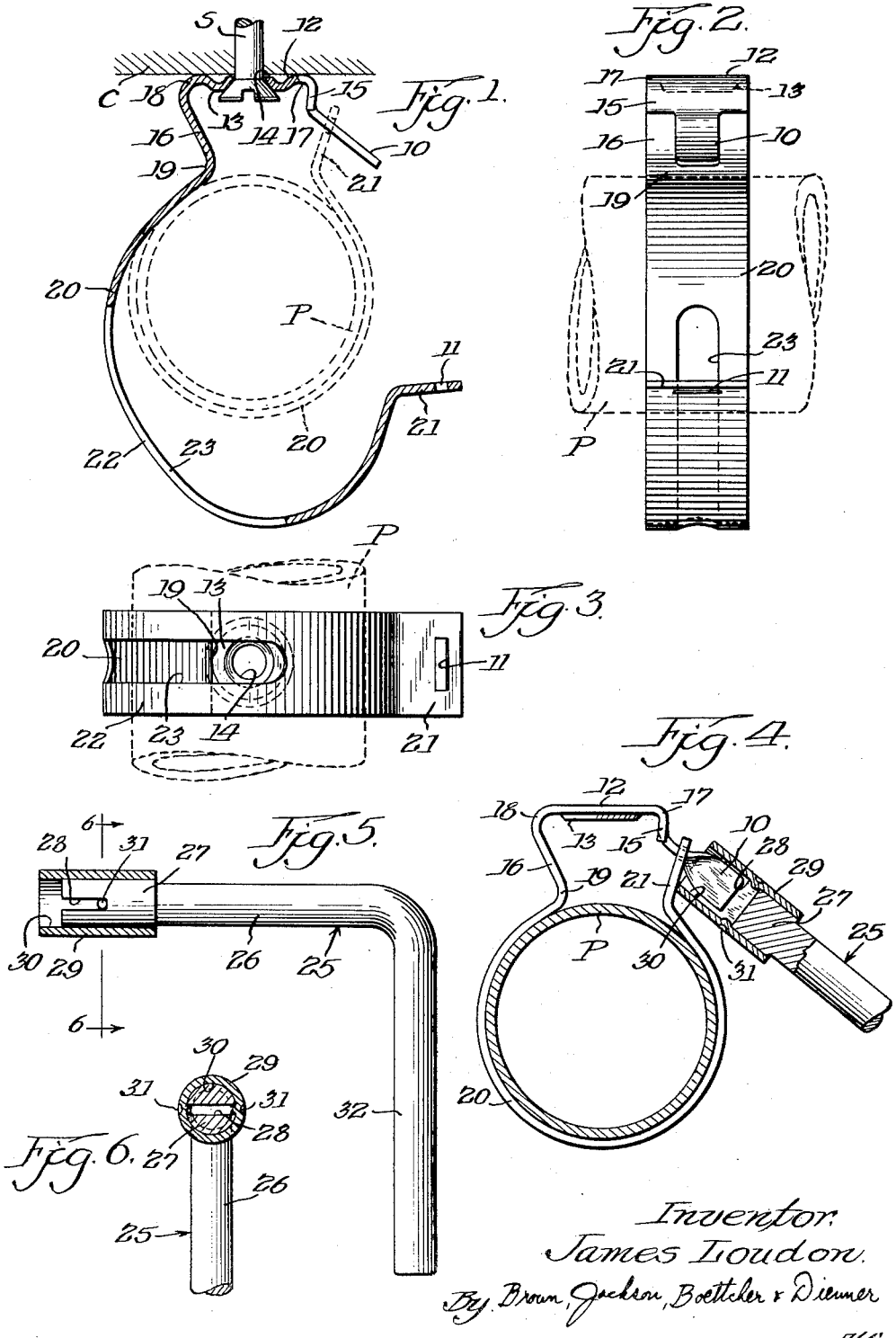

3,121,549
PIPE HANGER AND KEY
James Loudon, Arlington Heights, Ill., assignor to Minerallac Electric Company, Chicago, Ill., a corporation of Illinois
Filed Aug. 16, 1960, Ser. No. 49,888
6 Claims. (Cl. 248—74)

The present invention relates to a hanger or support for pipe, conduit and the like elongated elements.

It is an object of the invention to provide a pipe hanger which is easily mounted in place and simply and quickly locked in pipe securing condition.

Another object is the provision of a pipe hanger effecting close frictional contact with the pipe through a major portion of the circumference thereof.

Another object is the provision of a pipe hanger which accommodates itself to pipe varying from nominal or standard diameter.

It is another object to provide a pipe hanger which may be drawn up tightly about a pipe regardless of variations in the pipe diameter.

Another object is the provision of a pipe hanger which will support pipe loosely while lengths thereof are being coupled prior to locking of the hanger about the pipe so as to allow pipe movement and facilitate the coupling operation.

A further object is the provision of a pipe hanger which may be drawn up clampingly about a pipe and secured in the clamped relation by a single movement.

It is also an object of the invention to provide a pipe or like hanger bendable into clamping relation about a pipe with means for deforming the hanger to lock the same in the clamped relation.

Another object is the provision of a pipe hanger bendable into clamping relation about a pipe with interengaged tongue and slot at opposite ends, and a key adapted to deform the tongue against withdrawal from the slot while maintaining the clamping relation.

Another object is the provision of a pipe hanger having at opposite ends a slot and a tongue projectable through the slot and twistable to secure the ends, and a key for twisting the tongue without danger of shearing the same.

Another object is the provision of a key for non-shearingly twisting a tongue projecting through a slot to prevent withdrawal of the tongue.

A further object is the provision of a key adapted to twist into locking condition a tongue on one end of a pipe hanger projecting through a slot in the other end, and simultaneously to urge the slotted end along the tongue for tight clamping of the hanger on the pipe.

Other and further objects, advantages, and features of the present invention will be apparent to those skilled in the art from the following detailed description, taken in conjunction with the accompanying drawings, in which:

FIGURE 1 is a longitudinal sectional view through a hanger according to the invention, showing the hanger in full lines in the open pipe-receiving position, and showing in dotted lines the hanger in clamping relation about a pipe;

FIGURE 2 is a side elevation of the hanger as shown in FIGURE 1, taken from the pipe-receiving side of the hanger;

FIGURE 3 is a bottom plan view of the hanger as shown in FIGURE 1;

FIGURE 4 is an end elevational view of the pipe hanger locked in its pipe-clamping position, with a portion of a key by which the locking is accomplished being shown partly in section in its hanger-engaging position;

FIGURE 5 is an elevational view of a key according to the present invention, with a socket-defining portion thereof shown in section; and FIGURE 6 is a cross-sectional view of the key taken substantially as indicated by the line 6—6 of FIGURE 5.

Referring first particularly to FIGURES 1 to 3 inclusive of the drawings, there is shown a pipe hanger according to the invention which is formed of a length of suitable strap material of flexible metal or other suitable self-sustaining material, formed substantially to the initial shape shown in the drawing. The hanger is provided in different sizes corresponding to various sizes of pipe or conduit, as will be obvious. At one end of the strap, a tongue 10 of less width than the remainder of the hanger is formed by suitably cutting away portions of the material to leave the tongue protruding centrally from an end edge of the hanger. An elongated slot 11 is formed adjacent the other end of the hanger, extending transversely thereof and dimensioned to receive the tongue 10 freely therethrough. Adjacent the tongue end of the hanger, there is formed a supporting or base portion 12 which is generally flat so that it may engage securely against a supporting surface, such as a wall or ceiling, but is provided with an annular indentation or embossment 13 about a central opening 14 through which a screw S or similar fastening means may extend into the supporting member, such as the ceiling C as shown in FIGURE 1. Spacer portions 15 and 16 are connected to opposite margins of the base portion 12 by bent portions 17 and 18, respectively, converging toward each other, or in other words toward the axis of the screw aperture 14. The spacer portion 15 is relatively short, and its associated bend 17 is formed on a smaller radius than the bend 18 by which the spacer portion 16 is connected to the base portion, and the portion 16 is of appreciably greater length than the portion 15. The portion 15 extends between the base portion and the tongue portion of the hanger, and has the tongue 10 projecting outwardly therefrom.

The end of the spacer portion 16 opposite that at the bend 18 is connected by a reverse bend 19 to the main body 20 of the hanger which is initially curved adjacent the bend 19 to conform generally to the circumference of a pipe P to be supported thereby, the portion 20 extneding outwardly of the spacer portion 16 in the present case due to the relatively large size of the pipe P. The hanger body 20 extends inwardly across the axis of aperture 14, curving generally toward the tongue 10 on a radius corresponding generally to that of the pipe. The hanger body terminates in an end portion 21 in which the slot 11 is formed, the portion 21 being bent relatively sharply outwardly from the body 20 and being spaced from the tongue by a distance approximately the diameter of the pipe to be supported. Between the point of the body 20 spaced farthest from the axis of aperture 14 and the point thereof spaced farthest from the base portion 12, the body 20 has a flattened portion 22, opposite which is the gap or opening between the tongue 10 and the end portion 21 through which a pipe may be moved into the hanger. Throughout the length of this flattened portion 22, and preferably extending beyond both ends thereof, there is formed a slot 23 extending longitudinally and centrally of the body 20. As will be apparent from FIGURE 1, the hanger in use is secured to the ceiling C or other support by means of the screw S, and after insertion of pipe P, the flattened portion 22 is bent so that the body 20 is wrapped and clamped about the pipe, the end portion 21 being brought adjacent the spacer portion 15. The slot 23 increases the flexibility of the hanger, so as to facilitate the necessary manual bending of the material to allow the hanger to engage with a close clamping fit about the circumference of the pipe.

As the hanger is bent around the pipe, the end portion 21 is brought into engagement with the tongue 10 and receives it in the slot 11 so that the free end portion of the tongue projects outwardly of the end portion 21. The corners of the tongue may be rounded or beveled so as to facilitate entry thereof into the slot 11. By reason of the relatively sharp bend between the end spacer portion 15 and the base portion 12, the end portion 21 may engage close to the base or root of the tongue, if necessary, so that the hanger will adjust to a pipe, conduit, or the like of smaller actual diameter or circumference than the nominal or standard diameter or circumference. Of course, if the pipe is somewhat larger than nominal or standard, the hanger will adjust thereto by engagement of the bent portion 21 farther from the root of the tongue. In addition to increasing the flexibility of the hanger, the slot 23 provides a means for applying a screwdriver or like tool along the axis of the aperture 14 for securing the screw S or other fastening means in the ceiling C or other supporting surface, and the end of the slot adjacent the end portion 21 may serve to guide and brace such a tool, as will be evident. The greater flexibility afforded by the slot 23 also permits the hanger being bent or wrapped around the pipe P without any great distortion of such portion or portions thereof as are initially curved to conform substantially to the circumference of the pipe. When a length of pipe or conduit is supported in a plurality of the hangers, after the hangers have been secured to the supporting structure and before the hangers have been clamped about the pipe, the pipe may be shifted longitudinally or radially to facilitate its being coupled to other lengths or sections of pipe, the weight of the pipe sections being borne primarily by the hangers to give greater freedom to the hands of a workman in securing the ends of the pipe sections together. In a ceiling-supported arrangement such as illustrated in FIGURE 1, the pipe when loosely disposed in the hanger is received in the lower curved portion adjacent the end portion 21, the hanger material having sufficient stiffness and rigidity to retain its curvature under the weight of the pipe and thus retain the pipe within the hanger. It will be appreciated that if the pipe is to be supported from a wall, the hangers are secured with the space or gap between the tongue 10 and the end portion 21 directed upwardly, the pipe in such case resting in the curved part of the body 20 adjacent the portion 16, as will be obvious. In either case, the pipe is inserted laterally or radially through the space between the tongue and the end portion 21, which is sufficiently great to admit the pipe without difficulty, although it need not be greater than the diameter of the pipe and may be smaller, since the flexibility of the hanger material allows ready deflection thereof to permit entry of the pipe.

After the pipe has been received in supported relation in the hanger, the body 20 is bent or wrapped around the pipe as already described and the end portion 21 moved inwardly along the tongue 10 to draw the hanger tightly about the pipe in clamping relation, and while the hanger is held so tightly clamped about the pipe, the free end portion of the tongue 10 projecting outwardly through the slot 11 is twisted, as best shown in FIGURE 4, so as to extend transversely of the slot 11 and prevent movement of the end portion 21 outwardly from the spacer portion 15. Thus the hanger is maintained in tightly clamped relation with the pipe or conduit. This is important in practice, particularly in electrical work, because the pipe must be held securely and withstand the pulling strains resulting from drawing of long lengths of wire therethrough. In addition, when the conduit is used as a ground, the tight clamping relation between the pipe or conduit and the hanger is necessary to assure a good ground connection. As already pointed out, the hanger will adjust to variations of the pipe dimensions from standard dimensions, and similarly it will adjust to conduits or pipe of the same internal diameter but of different wall thickness, such as thin-wall and heavy-wall electrical conduits. As already explained, the adjustment is accomplished by movement of the end portion 21 a greater or lesser distance along the tongue 10, or put another way, by the greater or lesser length of the tongue 10 projecting outwardly of the slot 11.

It will be apparent that instead of being twisted to retain the hanger in the pipe-clamping condition, the tongue 10 might be bent back upon itself or otherwise deformed, but that because of the limited space between it and the supporting structure such bending is effectively ruled out. The practical difficulty and near-impossibility of accomplishing the bending in the small space available without allowing loosening of the hanger about the pipe, as well as the uneconomical expenditure of time required, makes such an operation altogether impractical. In addition, there would always be the danger that the tongue could not be bent sharply enough to prevent straightening of the tongue under the weight of the pipe, the tendency of the hanger to resume its open position, and vibrational stresses, so that the pipe would not be properly supported by the hanger. The twisting of the tongue to lock the ends of the hanger against separation provides a simple manner of securing the hanger in the desired tightly clamped relation on the pipe or conduit. It still involves maintaining the hanger in the clamped condition while twisting the tongue, and also avoiding such a sharp twisting of the tongue as to cause shearing of the material and thereby require replacement of the hanger. It is of course simple enough to twist the tongue by means of a pliers, wrench, or other suitable tool, but the use of such tools for this purpose involves considerable risk of shearing off the tongue, or at least starting a crack or tear in the material because of the twist having a short pitch. At the same time that the twist is given to the tongue, the end portion 21 must be held and forced as far along the tongue in the direction of the spacer portion 15 as possible to assure the proper tight clamping relation of the hanger on the pipe or conduit. While this may be accomplished by engaging against the end portion 21 a wrench, pliers, or other tool by which the tongue 10 is twisted, it is somewhat difficult to hold a tool in this relation and simultaneously urge the end portion 21 inwardly and also turn the tongue to give it the desired twist.

To derive the full benefits and advantages obtainable by the invention, accordingly, a key generally designated 25 is provided for cooperation with the hanger to obtain the desired tightly clamped support of a pipe, conduit, or like elongated element. The key is of wrench-like form, and is illustrated as made of a rod 26 preferably of circular cross-section, which has at one end thereof an enlarged portion 27. A diametrically extending slot 28 is formed in the end of the enlarged portion 27, extending inwardly for a suitable distance. A sleeve 29 is disposed surrounding the enlarged portion 27 and having a tight frictional fit thereon by which it is secured in place. The sleeve 29 projects outwardly of the slotted end of the rod enlargement 27 to provide a socket 30 the bottom of which is defined by the slotted end of the enlarged portion. The sleeve 29 is further secured or staked to the enlargement 27 by a pair of diametrically opposed detents 31 therein which deform the material thereof into the sides of the slot 28 at the bottom thereof, as best shown in FIGURE 4. The deformation provided by the dents 31 provides positive securement of the sleeve against inward movement or rotation, and also spreads the portions of the enlargement 27 separated by the slot 28 outwardly away from each other and into tighter frictional engagement with the sleeve 29 to assure its fixed relation on the enlargement. At its other end, the rod 26 is provided with a suitable handle for facilitating its rotation, the handle in this instance being shown as an integral end portion 32 of the rod bent to extend at substantially right angles thereto. It will be appreciated that the key might be otherwise formed than as specifically shown and described, but the key 25 as disclosed is effective, simple to produce, and inexpensive, avoiding any necessity for welding, expensive boring and machining, or complicated slotting operations. It is to be noted that the enlarged portion 27 need not be provided where the width of the tongue 10 is less than the diameter of the rod 26, the slot 28 in such case being formed in the end of the rod and the sleeve 29 being secured on the rod end substantially in the manner disclosed.

In operation, the key 25 is engaged with its socketed end against the end portion 21 of the hanger when the tongue 10 has been received through the slot 11, the end portion 21 is then pushed by the key toward the base of the tongue to draw the hanger tightly about the pipe or conduit and engage the tongue 10 in the slot 28, and the tongue is twisted by rotation of the tool, the entire operation being performed in one simple continuous movement. The slot 28 is dimensioned so as readily to receive the tongue 10 loosely therein, as will be obvious. It will be apparent that the actual twisting of the tongue 10 occurs between the bottom of the socket 30, or in other words the open end of the slot 28, and the slot 11 in the end portion 21 of the hanger, and that this length of twist, or in other words the pitch of the twist given the tongue, is determined by the depth of the socket 30. This minimum distance is chosen so that any shearing action on the tongue at any particular transverse plane is sufficiently minimized to avoid cracking or breaking of the material, the particular depth of the socket 30 depending upon the material of the tongue and the cross section thereof, as the major factors. The depth of the slot 28 is such that together with the depth of the socket 30 the bottom of the slat is spaced from the bearing edge of the key 25 a distance sufficient to allow all of the portion of the tongue 10 projecting outwardly beyond the end portion 21 to be received within the key. The tongue 10 is shown as twisted so that the end portion thereof extends in a plane substantially perpendicular to the base portion adjacent the spacer portion 15, or in other words so that it extends transversely of the slot 11, but the tongue might be twisted more or less than this and provide a secure lock between the ends of the hanger. As will be evident from FIGURE 4, it is not necessary that the entire bearing edge of the key engage against the end portion 21 of the hanger in forcing the same inwardly and turning the tongue 10, it being required only that the tongue be engaged in the slot 28 and that the end of the tool engage on the end portion 21 sufficiently to move it to and hold it in the drawn-up position.

It will be evident that the present invention affords great advantages in supporting pipe from a wall or ceiling, in that it provides a simple arrangement which may be manipulated easily and quickly to provide the desired clamping support of pipe, conduit, or similar members. Particularly in overhead installations, the invention is of great advantage because of the simple and rapid mounting of the hanger and the easy, quick, and positive operation enabled thereby, which results in a better securement and support of the pipe or the like and a saving in time and expense, as well as in both muscular and nervous energy.

It is to be understood that the invention is not restricted to the single embodiment thereof herein disclosed, which is illustrated and described by way of example and not limitation, since it will be apparent that many modifications and variations may be made without departing from the scope of the invention.

I claim:

1. In combination, a pipe hanger or the like comprising a relatively stiff flexible strap, a tongue extending from one end of said strap, a tongue-receiving slot adjacent the opposite end of the strap, a base portion adjacent the tongued end of the strap, spacer portions extending from opposite ends of the base portion in converging relation to each other, one of said spacer portions being relatively short and defining the tongued strap end and the other spacer portion being relatively long, an encircling portion extending from said other spacer portion to said slotted opposite end portion bendable in clamping relation about a pipe to dispose said tongue projecting through said slot, the tongue being twistable out of its original plane to secure the hanger against loosening on the pipe, and a key for non-shearingly twisting the tongue while engaging the slotted opposite end portion to urge the same along the tongue, said key comprising a rod, a socket on one end of said rod engageable at its open end on said slotted end portion and having a depth substantially corresponding to a pitch of twist avoiding shearing of the tongue, and a slot in the bottom of said socket for receiving the projecting end of the tongue to effect twisting thereof by rotation of the rod.

2. In combination, a pipe hanger or the like comprising a relatively stiff but flexible strap having a securing portion adjacent one end thereof, a tongue projecting from said one end of the strap, a slot adjacent the other end of the strap adapted to receive said tongue therethrough, an encircling portion integrally connected with the securing portion and extending to said other strap end bendable about pipe or the like to bring said ends adjacent each other with the tongue projecting through the slot, the tongue being twistable to position its projecting portion transversely of the slot for securing the strap ends against separation, and means for bending the encircling portion and disposing the tongue through the slot and twisting the projecting tongue portion comprising a rod having a longitudinal slot in one end thereof adapted to receive said tongue therein, and a skirt portion surrounding said slot and projecting beyond said rod end to define a socket, the open end of said socket being abuttable on said other strap end over the transverse slot to urge the same toward the one strap end with the tongue extending through the transverse slot and into the slot in the rod for drawing up said encircling portion tightly about said pipe or the like and twisting the tongue portion outwardly of the transverse slot to extend thereacross by rotation of the rod for securing the encircling portion against release from drawn up condition, the depth of said socket governing the pitch of the twist in the tongue to prevent shearing thereof.

3. In combination, a relatively stiff flexible strap-like element, a tongue projecting from one end of said element, a slot in the element adapted to receive said tongue therethrough, said element being bendable to dispose the tongue projecting through said slot and the tongue being deformable to position the projecting portion thereof out of its original plane for preventing unbending of the element, and a key for deforming the tongue comprising a rod, a slot extending longitudinally inwardly from one end of said rod adapted to receive the free end of the tongue therein, and means projecting outwardly of said rod end abuttable on the element adjacent the slot to urge the same along the tongue as the key is manipulated to deform the tongue.

4. For use in securing in supporting relation about pipe or the like a hanger formed of flexible self-sustaining material having a tongue projecting from one end and a tongue-receiving slot extending transversely of the other end with an intermediate encircling portion bendable about pipe or the like to bring said hanger ends adjacent each other with said tongue engaged through said slot, a key for drawing up said encircling portion and twisting the free end portion of the tongue to secure the encircling portion against release from its drawn-up condition, comprising a rod, a longitudinal slot through one end of said rod, a tubular socket-defining member surrounding said slot in tight frictional engagement with the rod and projecting outwardly of said rod end, opposed indentations in the tubular member in transverse alignment with the slot providing projections of the tubular member in the slot interengaging the tubular member with the rod and tightly wedging the rod in the tubular member, and handle means for manipulating the rod.

5. For use in securing a pipe hanger or the like in supporting relation by twisting of a tongue on the hanger provided for the purpose, a key for twisting said tongue comprising a rod, a socket formed on one end of said rod, a transverse slot in the bottom of said socket for receiving the end portion of the hanger tongue, and handle means for manipulation of the rod for axial movement to engage with said tongue and for rotational movement upon reception of the tongue in the slot to twist the tongue to securing condition, the depth of said socket being sufficient to impart a relatively large pitch to the twist for preventing shearing of the tongue.

6. For use in securing in clamped supporting relation about a pipe or the like a hanger having a tongue projecting through a slot, a key comprising a rod, a longitudinally inwardly extending slot in one end of the rod adapted to receive the projecting free end portion of said tongue, and means projecting longitudinally outwardly of said rod end abuttable on the hanger adjacent said hanger slot to prevent relative tongue-retracting movement while allowing manipulation of the rod to effect deformation of the tongue for locking the parts against separating movement.

References Cited in the file of this patent

UNITED STATES PATENTS

| | | |
|---|---|---|
| 543,233 | Forrester | July 23, 1895 |
| 1,080,560 | Johanson | Dec. 9, 1913 |
| 1,424,178 | Noyes | Aug. 1, 1922 |
| 1,469,662 | Leopold | Oct. 2, 1923 |
| 1,514,455 | Gordon | Nov. 4, 1924 |
| 1,747,136 | Putnam | Feb. 11, 1930 |
| 2,304,973 | Vecchiola | Dec. 15, 1942 |
| 2,547,813 | Coons | Apr. 3, 1951 |
| 2,549,515 | Orey | Apr. 17, 1951 |
| 2,618,450 | Thomas | Nov. 18, 1952 |
| 2,890,462 | Ross | June 16, 1959 |

FOREIGN PATENTS

| | | |
|---|---|---|
| 601,392 | Canada | July 12, 1960 |